(12) United States Patent
Jo et al.

(10) Patent No.: US 9,432,659 B2
(45) Date of Patent: Aug. 30, 2016

(54) DISPLAY APPARATUS AND CONTROL METHOD THEREOF

(71) Applicant: SAMSUNG ELECTRONICS CO., LTD., Suwon (KR)

(72) Inventors: Young-hun Jo, Seoul (KR); Sung-soo Kim, Suwon (KR); Hwa-seok Seong, Suwon (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 380 days.

(21) Appl. No.: 13/955,735

(22) Filed: Jul. 31, 2013

(65) Prior Publication Data

US 2014/0078269 A1   Mar. 20, 2014

(30) Foreign Application Priority Data

Sep. 19, 2012  (KR) .................. 10-2012-0104013

(51) Int. Cl.
  *H04N 13/04*  (2006.01)
  *H04N 13/00*  (2006.01)
(52) U.S. Cl.
  CPC ...... *H04N 13/0422* (2013.01); *H04N 13/0018* (2013.01); *H04N 13/0025* (2013.01); *H04N 13/0033* (2013.01)
(58) Field of Classification Search
  CPC .............. H04N 13/0422; H04N 13/0018; H04N 13/0033; H04N 13/0025
  See application file for complete search history.

(56) References Cited

U.S. PATENT DOCUMENTS

| 2009/0309903 A1* | 12/2009 | Park | G09G 3/3611 345/690 |
| 2010/0225682 A1* | 9/2010 | Nakahata | H04N 13/0434 345/695 |
| 2011/0090308 A1* | 4/2011 | Chen | G09G 3/003 348/43 |

* cited by examiner

Primary Examiner — Sath V Perungavoor
Assistant Examiner — Xiaolan Xu
(74) Attorney, Agent, or Firm — Staas & Halsey LLP

(57) ABSTRACT

A display apparatus which outputs a stereoscopic image and a control method thereof, the display apparatus includes: an image input part which receives left and right eye image frames; an image processor which generates a left eye image interpolation frame by using a gradation difference of areas between a previous right eye image frame of the left eye image frame and the left eye image frame and generates a right eye image interpolation frame by using a gradation difference of areas between a previous left eye image frame of the right eye image frame and the right eye image frame; a display which displays the left eye image interpolation frame, the left eye image frame, the right eye image interpolation frame, and the right eye image frame sequentially according to a preset order; and a controller which controls the image processor to generate the left and right eye image interpolation frames.

21 Claims, 10 Drawing Sheets

FIG. 3

| | 0 | 16 | 32 | 48 | 64 | 80 | 96 | 112 | 128 | 144 | 160 | 176 | 192 | 208 | 224 | 240 | 255 |
|---|---|---|---|---|---|---|---|---|---|---|---|---|---|---|---|---|---|
| 16 | 1 | 1 | 0.9 | 0.7 | 0.5 | 0.3 | 0 | 0 | 0 | 0 | 0 | 0 | 0 | 0 | 0 | 0 | 0 |
| 32 | 1 | 1 | 1 | 0.9 | 0.7 | 0.5 | 0.3 | 0 | 0 | 0 | 0 | 0 | 0 | 0 | 0 | 0 | 0 |
| 48 | 0.9 | 1 | 1 | 1 | 0.9 | 0.7 | 0.5 | 0.3 | 0 | 0 | 0 | 0 | 0 | 0 | 0 | 0 | 0 |
| 64 | 0.7 | 0.9 | 1 | 1 | 1 | 0.9 | 0.7 | 0.5 | 0.3 | 0 | 0 | 0 | 0 | 0 | 0 | 0 | 0 |
| 80 | 0.5 | 0.7 | 0.9 | 1 | 1 | 1 | 0.9 | 0.7 | 0.5 | 0.3 | 0 | 0 | 0 | 0 | 0 | 0 | 0 |
| 96 | 0.3 | 0.5 | 0.7 | 0.9 | 1 | 1 | 1 | 0.9 | 0.7 | 0.5 | 0.3 | 0 | 0 | 0 | 0 | 0 | 0 |
| 112 | 0 | 0.3 | 0.5 | 0.7 | 0.9 | 1 | 1 | 1 | 0.9 | 0.7 | 0.5 | 0.3 | 0 | 0 | 0 | 0 | 0 |
| 128 | 0 | 0 | 0.3 | 0.5 | 0.7 | 0.9 | 1 | 1 | 1 | 0.9 | 0.7 | 0.5 | 0.3 | 0 | 0 | 0 | 0 |
| 144 | 0 | 0 | 0 | 0.3 | 0.5 | 0.7 | 0.9 | 1 | 1 | 1 | 0.9 | 0.7 | 0.5 | 0.3 | 0 | 0 | 0 |
| 160 | 0 | 0 | 0 | 0 | 0.3 | 0.5 | 0.7 | 0.9 | 1 | 1 | 1 | 0.9 | 0.7 | 0.5 | 0.3 | 0 | 0 |
| 176 | 0 | 0 | 0 | 0 | 0 | 0.3 | 0.5 | 0.7 | 0.9 | 1 | 1 | 1 | 0.9 | 0.7 | 0.5 | 0.3 | 0 |
| 192 | 0 | 0 | 0 | 0 | 0 | 0 | 0.3 | 0.5 | 0.7 | 0.9 | 1 | 1 | 1 | 0.9 | 0.7 | 0.5 | 0 |
| 208 | 0 | 0 | 0 | 0 | 0 | 0 | 0 | 0.3 | 0.3 | 0.7 | 0.9 | 1 | 1 | 1 | 0.9 | 0.7 | 0 |
| 224 | 0 | 0 | 0 | 0 | 0 | 0 | 0 | 0 | 0 | 0.5 | 0.7 | 0.9 | 1 | 1 | 1 | 0.9 | 0 |
| 240 | 0 | 0 | 0 | 0 | 0 | 0 | 0 | 0 | 0 | 0.3 | 0.5 | 0.7 | 0.9 | 1 | 1 | 1 | 0 |
| 255 | 0 | 0 | 0 | 0 | 0 | 0 | 0 | 0 | 0 | 0 | 0.3 | 0.5 | 0.7 | 0.9 | 1 | 1 | 0 |

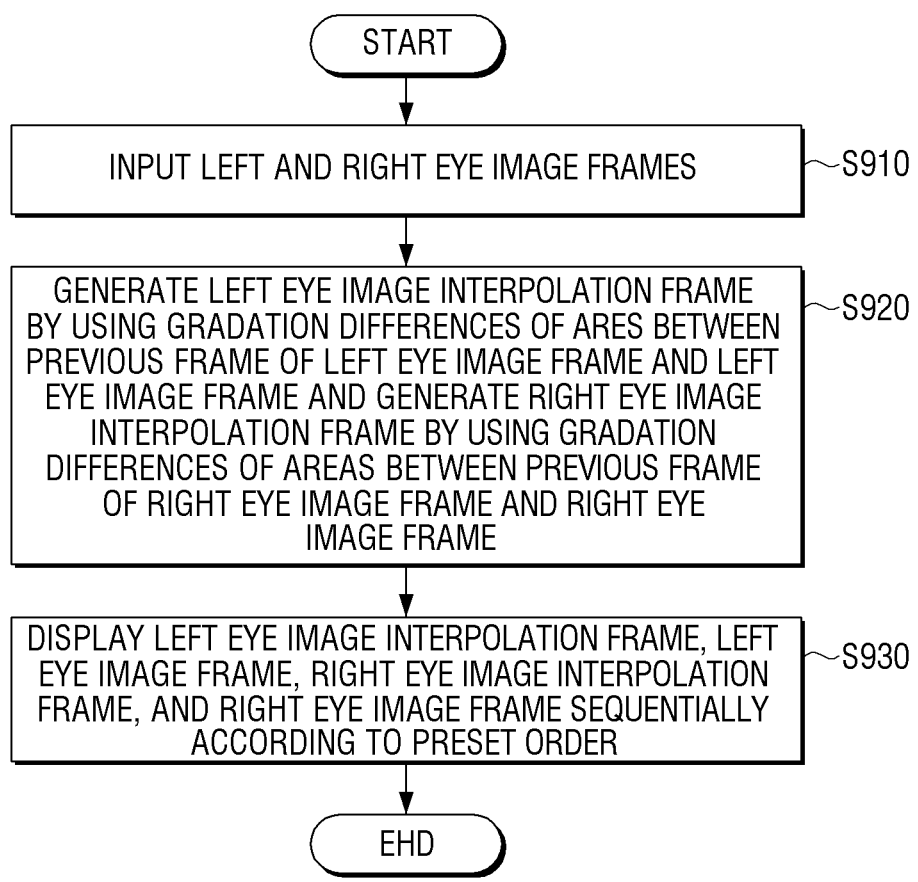

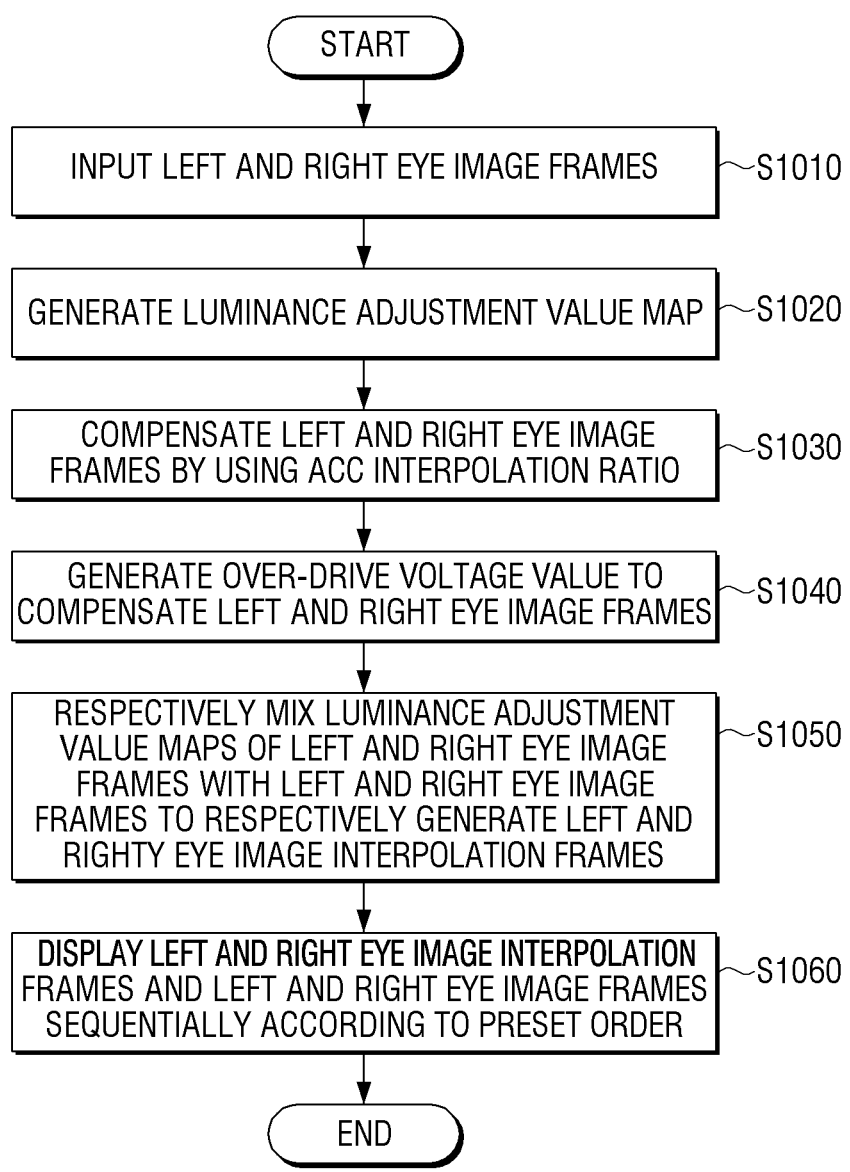

DISPLAY APPARATUS AND CONTROL METHOD THEREOF

CROSS-REFERENCE TO RELATED APPLICATIONS

This application claims priority benefit from Korean Patent Application No. 10-2012-104013, filed on Sep. 19, 2012, in the Korean Intellectual Property Office, the disclosure of which is incorporated herein by reference in its entirety.

BACKGROUND

1. Field

The present general inventive concept generally relates to a display apparatus and a control method thereof, and more particularly, to a 3-dimensional (3D) display apparatus which improves a crosstalk and a low luminance, and a control method thereof.

2. Description of the Related Art

High expectations are being placed on a 3-dimensional (3D) display apparatus which displays a stereoscopic image. Since the 3D display apparatus displays a perspective of an image, a viewer enjoys a realistic image through the 3D display apparatus.

In general, if a liquid crystal panel of a display apparatus displays a stereoscopic image, a part of a right eye image overlaps with a left eye image due to a slow response characteristic of a liquid crystal or a part of the left eye image overlaps with the right eye image, i.e., a crosstalk problem occurs.

In order to solve the crosstalk problem occurring when displaying the stereoscopic image, a display apparatus manufacturer uses a method of increasing a driving frequency of the liquid crystal panel and then inserting frame data helping an improvement of a response characteristic of the liquid crystal between left and right eye image frames.

The method of inserting the frame data is classifies into: a black frame insertion (BFI) method of inserting and displaying black data between left and right eye image frames; and a pre-tilt frame insertion (PFI) method of inserting and displaying data obtained by multiplying left or right eye image data by a predetermined ratio smaller than 1 between left and right eye image frames.

According to the BFI method, a falling response of the liquid crystal is improved due to the black data inserted between the left and right eye image frames, and thus a crosstalk is reduced, but a luminance is lowered. According to the PFI method, a rising response of the liquid crystal is improved due to pre-tilt data inserted between the left and right eye image frames, and thus a luminance is increased. However, a falling response becomes slower, and thus a crosstalk is increased. Therefore, the falling response is applied to a liquid crystal panel having a fast falling response.

Therefore, there is a need for a technique to improve a crosstalk and a low luminance.

SUMMARY

Additional aspects and/or advantages will be set forth in part in the description which follows and, in part, will be apparent from the description, or may be learned by practice of the invention.

Exemplary embodiments address at least the above problems and/or disadvantages and other disadvantages not described above. Also, the exemplary embodiments are not required to overcome the disadvantages described above, and an exemplary embodiment may not overcome any of the problems described above.

The exemplary embodiments provide a display apparatus which improves a crosstalk and a low luminance, and a control method thereof.

According to an aspect of the exemplary embodiments, there is provided a display apparatus including: an image input part which receives left and right eye image frames; an image processor which generates a left eye image interpolation frame by using a gradation difference of areas between a previous right eye image frame of the left eye image frame and the left eye image frame received from the image input part and generates a right eye image interpolation frame by using a gradation difference of areas between a previous left eye image frame of the right eye image frame and the right eye image frame received from the image input part; a display which displays the left eye image interpolation frame, the left eye image frame, the right eye image interpolation frame, and the right eye image frame according to a preset order; and a controller which controls the image processor to generate the left and right eye image interpolation frames.

The image processor may: divide the left eye image frame and the previous right eye image frame of the left eye image frame into a plurality of areas, compare gradations of the left eye image frame and the previous right eye image frame according to the areas to calculate luminance adjustment values of the areas, and generate the left eye image interpolation frame by using the calculated luminance adjustment values; and divide the right eye image frame and the previous left eye image frame of the right eye image frame into a plurality of areas, compare gradations of the right eye image frame and the previous left eye image frame according to the areas to calculate luminance adjustment values of the areas, and generate the right eye image interpolation frame by using the calculated luminance adjustment values.

The image processor may: calculate gradation differences of the areas between the left eye image frame and the previous right eye image frame, determine luminance adjustment values of the areas on levels corresponding to sizes of the gradation differences from levels between 0 and 1, and apply the determined luminance adjustment values to the areas to generate a first luminance adjustment value map of the left eye image frame; and calculate gradation differences of the areas between the right eye image frame and the previous left eye image frame, determine luminance adjustment values of the areas on levels corresponding to sizes of the gradation differences from levels between 0 and 1, and apply the luminance adjustment values to the areas to generate a second luminance adjustment value map of the right eye image frame.

The image processor may perform a space filtering work with respect to the first and second luminance adjustment value maps, calculate an Accurate Color Capture (ACC) interpolation ratio respectively from the filtered first and second luminance adjustment value maps, and compensate the left and right eye image frames by using the ACC interpolation ratio.

The first luminance adjustment value map may be mixed with the left eye image frame to generate the left eye image interpolation frame. The second luminance adjustment value map may be mixed with the right eye image frame to generate the right eye image interpolation frame.

The image processor may generate an over-drive voltage value to compensate the left and right eye image frames.

According to another aspect of the exemplary embodiments, there is provided a method of controlling a display apparatus. The method may include: receiving left and right eye image frames; generating a left eye image interpolation frame by using a gradation difference of areas between a previous right eye image frame of the left eye image frame and the left eye image frame and generating a right eye image interpolation frame by using a gradation difference of areas between a previous left eye image frame of the right eye image frame and the right eye image frame; and displaying the left eye image interpolation frame, the left eye image frame, the right eye image interpolation frame, and the right eye image frame according to a preset order.

The generation of the left and right eye image interpolation frames may include: dividing the left eye image frame and the previous right eye image frame of the left eye image frame into a plurality of areas, comparing gradations of the left eye image frame and the previous right eye image frame according to the areas to calculate luminance adjustment values of the areas, and generating the left eye image interpolation frame by using the calculated luminance adjustment values; and dividing the right eye image frame and the previous left eye image frame of the right eye image frame into a plurality of areas, comparing gradations of the right eye image frame and the previous left eye image frame according to the areas to calculate luminance adjustment values of the areas, and generating the right eye image interpolation frame by using the calculated luminance adjustment values.

The method may further include: calculating gradation differences of the areas between the left eye image frame and the previous right eye image frame, determining luminance adjustment values of the areas on levels corresponding to sizes of the gradation differences from levels between 0 and 1, and applying the determined luminance adjustment values to the areas to generate a first luminance adjustment value map of the left eye image frame; and calculating gradation differences of the areas between the right eye image frame and the previous left eye image frame, determining luminance adjustment values of the areas on levels corresponding to sizes of the gradation differences from levels between 0 and 1, and applying the luminance adjustment values to the areas to generate a second luminance adjustment value map of the right eye image frame.

The method may further include: performing a space filtering work with respect to each of the first and second luminance adjustment value maps, calculating an ACC interpolation ratio respectively from the filtered first and second luminance adjustment value maps, and compensating the left and right eye image frames by using the ACC interpolation ratio.

The generation of the left and right eye image interpolation frames may include: mixing the first luminance adjustment value map with the left eye image frame to generate the left eye image interpolation frame; and mixing the second luminance adjustment value map with the right eye image frame to generate the right eye image interpolation frame.

The method may further include generating an over-drive voltage value to compensate the left and right eye image frames.

As described above, according to various exemplary embodiments of the present general inventive concept, a crosstalk and a low luminance may be improved, thereby improving an image quality of the display apparatus.

BRIEF DESCRIPTION OF THE DRAWINGS

The above and/or other aspects will be more apparent by describing certain exemplary embodiments with reference to the accompanying drawings, in which:

FIG. 3 is a view illustrating a luminance adjustment value table according to an exemplary embodiment of the present general inventive concept;

FIGS. 9 and 10 are flowcharts illustrating a method of controlling a display apparatus according to an exemplary embodiment of the present general inventive concept.

DETAILED DESCRIPTION

Figure 1:
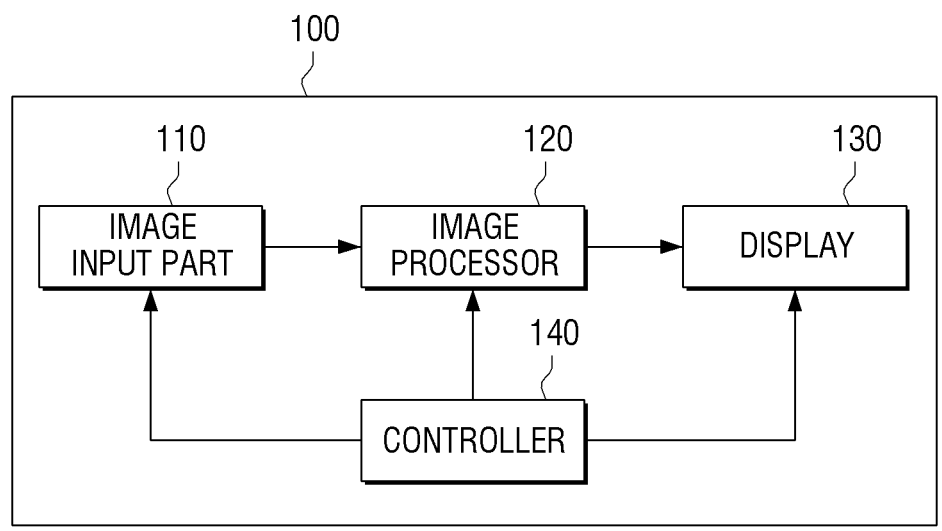
FIG. 1 is a block diagram illustrating a structure of a display apparatus according to an exemplary embodiment of the present general inventive concept.

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

FIG. 1 is a block diagram illustrating a structure of a display apparatus 100 according to an exemplary embodiment of the present general inventive concept.

Referring to FIG. 1, the display apparatus 100 includes an image input part 110, an image processor 120, a display 130, and a controller 140. The image input part 110 receives stereoscopic image data, i.e., left and right eye image frames. The display 130 displays a left eye image interpolation frame, the left eye image frame, a right eye image interpolation frame, and the right eye image frame according to a preset order. As non-limiting examples, the display 130 may display a left eye image interpolation frame, the left eye image frame, a right eye image interpolation frame, and the right eye image frame sequentially according to the preset order, or display a right eye image interpolation frame, the right eye image frame, the left eye image interpolation frame and the left eye image frame sequentially according to the preset order. The controller 140 controls the image input part 110, the image processor 120, and the display 130 to perform their operations.

The image processor 120 alternately and consecutively receives the left and right eye image frames. The image processor 120 generates the left eye image interpolation frame by using gradation differences of areas between the left eye image frame and a previous right eye image frame of the left eye image frame. The image processor 120 also generates the right eye image interpolation frame by using gradation differences of areas between the right eye image frame and a previous left eye image frame of the right eye image frame. A previous frame and a current frame of a left or right eye image are divided into areas, and data of the previous and current frames is used to generate the right or left eye image interpolation frame.

Black data or data close to black is inserted into an area of the left or right eye image interpolation frame in which a black-to-white crosstalk occurs due to a great gradation difference between data of the previous frame and data of the current frame, among the areas of the left or right eye image interpolation frame. Therefore, a falling response is improved, and thus a crosstalk is inhibited. Data having a predetermined value is inserted into an area of the left or right eye image interpolation frame in which the gradation difference is not great between the data of the previous frame and the data of the current frame. Therefore, a low luminance is improved. A detailed method of generating an interpolation frame will be described later. Before the method of generating the interpolation frame is described, a detailed structure of the image processor 120 will be described.

Figure 2:
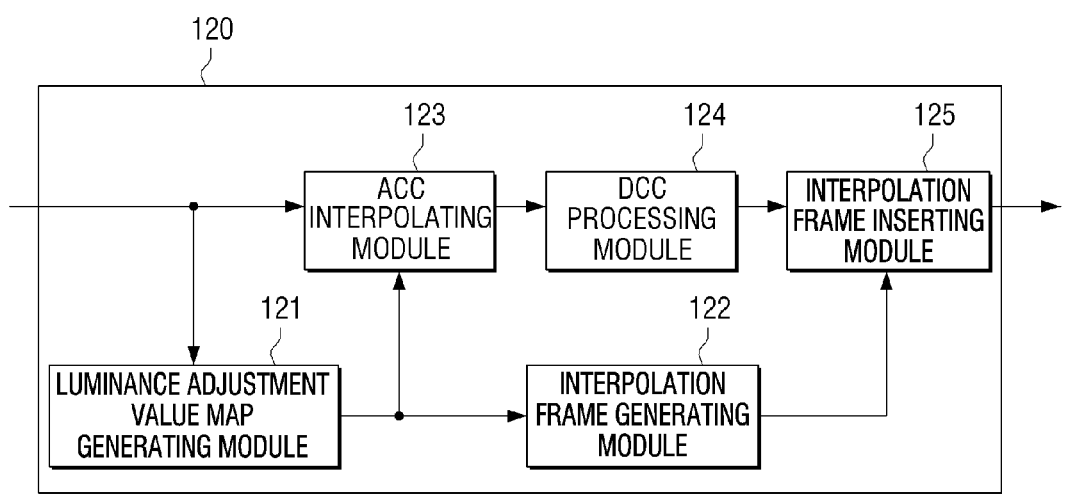
FIG. 2 is a block diagram illustrating a structure of an image processor according to an exemplary embodiment of the present general inventive concept.

FIG. 2 is a block diagram illustrating a structure of the image processor 120, according to an exemplary embodiment of the present general inventive concept.

The image processor 120 includes a luminance adjustment value map generating module 121, an interpolation frame generating module 122, an Accurate Color Capture (ACC) interpolating module 123, a Dynamic Capacitance Compensation (DCC) processing module 124, and an interpolation frame inserting module 125.

The luminance adjustment value map generating module 121 calculates a crosstalk amount of each area based on data of input left and right eye image frames and determines a luminance adjustment value alpha ($\alpha$) which is to be applied to the data of the left and right eye image frames according to the calculated crosstalk amount. A crosstalk amount may be proportional to a difference between data of the current and previous frames of an image frame. For example, a crosstalk amount increases with an increase in a difference between data of current and previous frames of an image frame and decreases with a decrease in the difference. Therefore, a luminance adjustment value $\alpha$ of an area in which a difference between data of current and previous frames is great is determined as a value close to 0 in order to inhibit a crosstalk rather than to improve a luminance. A luminance adjustment value $\alpha$ of an area in which the difference between the data of the current and previous frames is small is determined as a value close to 1 in order to improve a luminance.

One frame is divided into areas, and luminance adjustment values determined for the areas are applied to the areas to generate a luminance adjustment value map. The luminance adjustment value map is generated with respect to each of left and right eye image frames. For convenience, a luminance adjustment value map of the left eye image frame is referred to as a first luminance adjustment value map, and a luminance adjustment value map of the right eye image frame is referred to as a second luminance adjustment value map. A method similar to a BFI method (of inserting a black frame between left and right eye image frames) is applied to areas having luminance adjustment values of 0. A method similar to a method of displaying left and right eye image frames every two times is applied to areas having luminance adjustment values of 1. Therefore, one whole frame has effects of inhibiting a crosstalk and improving a luminance.

The interpolation frame generating module 122 mixes the luminance adjustment value map generated by the luminance adjustment value generating module 121 with a current image frame to generate an interpolation frame. In other words, the first luminance adjustment value map is mixed with a left eye image frame to generate a left eye image interpolation frame. The second luminance adjustment value map is mixed with a right eye image frame to generate a right eye image interpolation frame.

The ACC interpolating module 123 calculates an interpolation ratio to compensate a color coordinate and a gamma characteristic of a liquid crystal, from a luminance adjustment map to compensate an image frame. The gamma characteristic of the liquid crystal varies with a luminance adjustment value. Therefore, when the luminance adjustment value is changed, a compensation table to compensate a luminance characteristic corresponding to the luminance adjustment value is required. The luminance characteristic varying with the luminance adjustment value is compensated by using the compensation table. A detailed method will be described later.

The DCC processing module 124 generates an over-drive voltage to reach a target luminance level based on previous and current image frame data to compensate the current image frame data.

A DCC refers to a method of comparing a gradation value of a previous frame and a gradation value of a current frame for an arbitrary pixel and processing RGB data to add a value greater than a difference between the gradation values to the gradation value of the previous frame. When a voltage is applied to both ends of a liquid crystal material in the arbitrary pixel, the liquid crystal material requires a time to respond to the voltage. Therefore, a time is delayed to express a target gradation value. The DCC is a technique to minimize such a time delay.

For example, when the gradation value of the previous frame is 118, and the gradation value of the current frame is 128 for the arbitrary pixel, a gradation value (a compensation value) to which a value greater than difference value 10 between the gradation values is added, e.g., 135, is changed to the gradation value of the current frame. In the DCC method, a frame memory is required to store data of the previous frame, and the compensation value may be determined by a DCC look-up table (LUT) written based on the data of the previous frame and the data of the current frame. A size of the DCC LUT is related to the number of bits of two compared pieces of data and increases with an increase in the number of bits. Therefore, the number of bits of data stored in the frame memory is generally smaller than the number of bits of input RGB data.

The interpolation frame inserting module 125 respectively inserts and outputs the left and right eye image interpolation frames generated by the interpolation frame generating module 122 into the left and right eye image frames.

The above-described modules of the image processor 120 may be realized as hardware, which is a physical structure, or software. Detailed operations of the modules of the image processor 120 will be described later. A generation of a luminance adjustment value map will be first described.

FIG. 3 is a view illustrating a luminance adjustment value table according to an exemplary embodiment of the present general inventive concept.

Referring to FIG. 3, a luminance adjustment value table of gradation values of a previous frame is written according to gradation values of a current frame. A first row 11 of FIG. 3 denotes gradation values of the previous frame, and a first column 12 of FIG. 3 denotes luminance values of the current frame. A left lower area 21 of FIG. 3 indicates that a luminance of the current frame becomes brighter than that of the previous frame. A right upper area 22 of FIG. 3 indicates that the luminance of the current frame becomes darker than that of the previous frame. A middle diagonal area 23 of FIG. 3 indicates that the luminance of the current frame is the same as that of the previous frame. Each area of FIG. 3 denotes a luminance adjustment value between 0 and 1. For example, if a luminance value of the previous frame is 144, and a luminance value of the current frame is 80, a luminance adjustment value is set to 0.5 as shown in the area 24 in FIG. 3.

The right upper area 22 and the left lower area 21 indicate that a gradation difference between the current and previous frames is great, and thus a crosstalk is a problem, and a luminance adjustment value to inhibit the crosstalk is applied. The middle diagonal area 23 indicates that the luminance of the current frame is not changed, and thus a luminance adjustment value to improve a luminance is applied. Therefore, the luminance adjustment value may be set to 1.

As described above, the luminance adjustment value may be set based on the gradation values of the current and previous frames. However, the luminance adjustment value may be changed according to a characteristic (e.g., a response speed) of a liquid crystal panel or an intention of a designer. Alternatively, another compensation value may be additionally applied to set the luminance adjustment value.

The image processor 120 divides previous and current frames of left and right eye image frames into a plurality of areas. The image processor 120 compares gradation values of the previous and current frames with respect to the plurality of areas. The image processor 120 generates a luminance adjustment value map in which luminance adjustment values of the plurality of areas are set based on the luminance adjustment value table of FIG. 3.

Figure 4A:
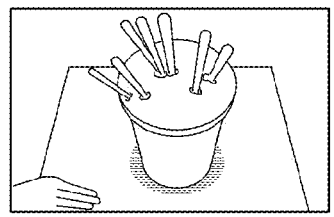
FIGS. 4A and 4B are views illustrating a luminance adjustment value map applied to one image frame according to an exemplary embodiment of the present general inventive concept.
Figure 4B:
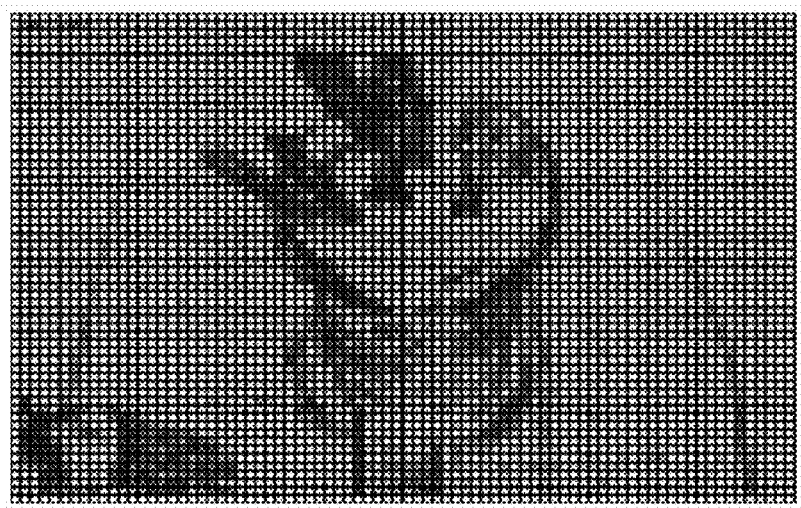

FIGS. 4A and 4B are views illustrating a luminance adjustment value map applied to one image frame according to an exemplary embodiment of the present general inventive concept.

FIG. 4A illustrates one image frame input from the image input part 110. The image input part 110 receives left and right eye image frames. However, processes of processing the left and right eye image frames are the same, and thus one image frame will be described for the descriptive convenience.

If an image frame is input, the luminance adjustment value generating module 121 divides the image frame into a plurality of areas. Luminance adjustment values of the plurality of areas are set based on the luminance adjustment value table described with reference to FIG. 3.

FIG. 4B illustrates a luminance adjustment value map in which the luminance adjustment values of the plurality of areas are set based on the luminance adjustment value table. In FIG. 4B, an area expressed with black or a color close to black refers to an area in which a difference between gradation values of the previous and current frames is great. An area expressed with white or a color close to white refers to an area in which the gradation values of the previous and current frames are same or substantially same.

Space filtering may be performed with respect to the generated luminance adjustment value map to remove inconsecutive gradation changes caused by luminance differences between the areas.

Figure 5:
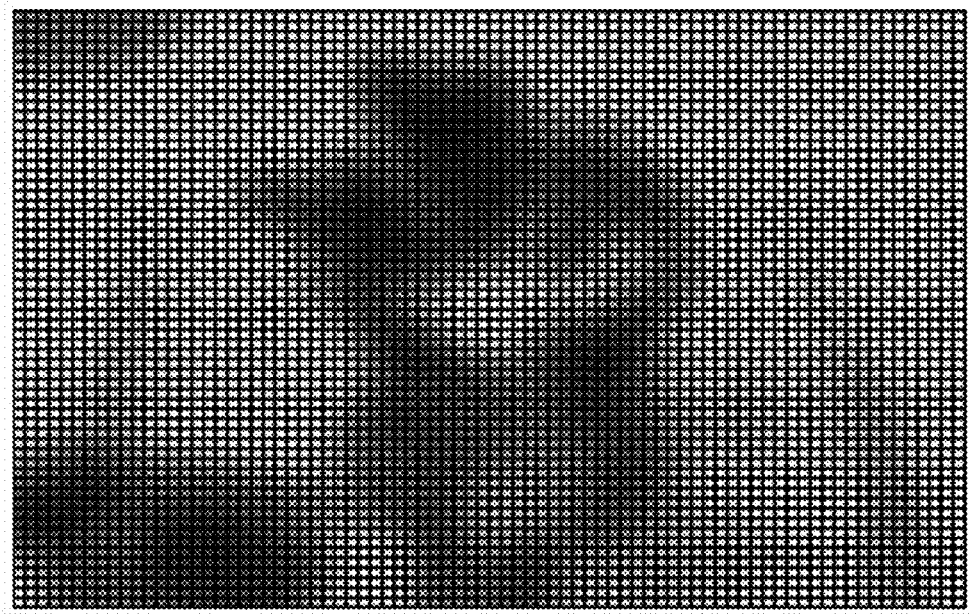
FIG. 5 is a view illustrating space filtering according to an exemplary embodiment of the present general inventive concept.

FIG. 5 is a view illustrating space filtering according to an exemplary embodiment of the present general inventive concept.

The luminance adjustment value generating module 121 divides a frame image into a plurality of images and determines luminance adjustment values of the plurality of areas based on a luminance adjustment value table. A luminance adjustment value map in which the luminance adjustment values of the plurality of areas are set is generated.

A difference between luminance adjustment values of adjacent areas is visually recognized and causes inconsecutive gradation changes between areas. Therefore, space filtering is performed with respect to the generated luminance adjustment value map performs to remove the inconsecutive gradation changes.

The space filtering is to evaluate a correlation between adjacent areas with reference to color information and luminance information between areas of a current image frame and diffuse a difference value of a luminance adjustment value into an adjacent area by a predetermined ratio according to the correlation. In other words, a diffusion amount of a difference value of a luminance adjustment value increases in a similar area in which a color difference between adjacent areas is small. A diffusion amount of a difference value of a luminance adjustment value decreases in a boundary area in which a color difference between adjacent areas is great. Therefore, the performance of the space filtering removes the inconsecutive gradation changes and improves a luminance. The luminance adjustment value map in which the space filtering is performed is used by the interpolation frame generating module 122 and the ACC interpolating module 123.

Figure 6:
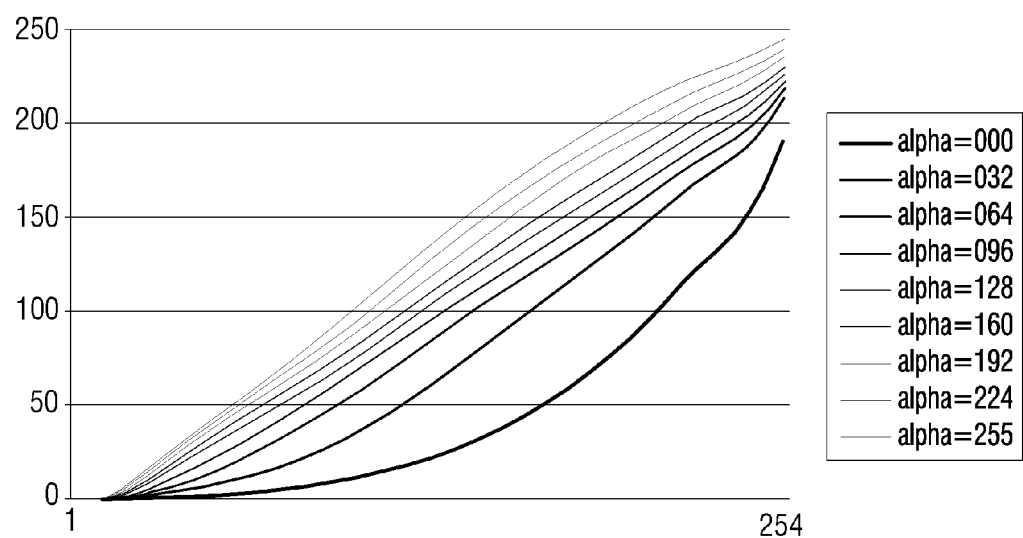
FIGS. 6 and 7 are graphs illustrating an Accurate Color Capture (ACC) interpolation method according to an exemplary embodiment of the present general inventive concept.
Figure 7:
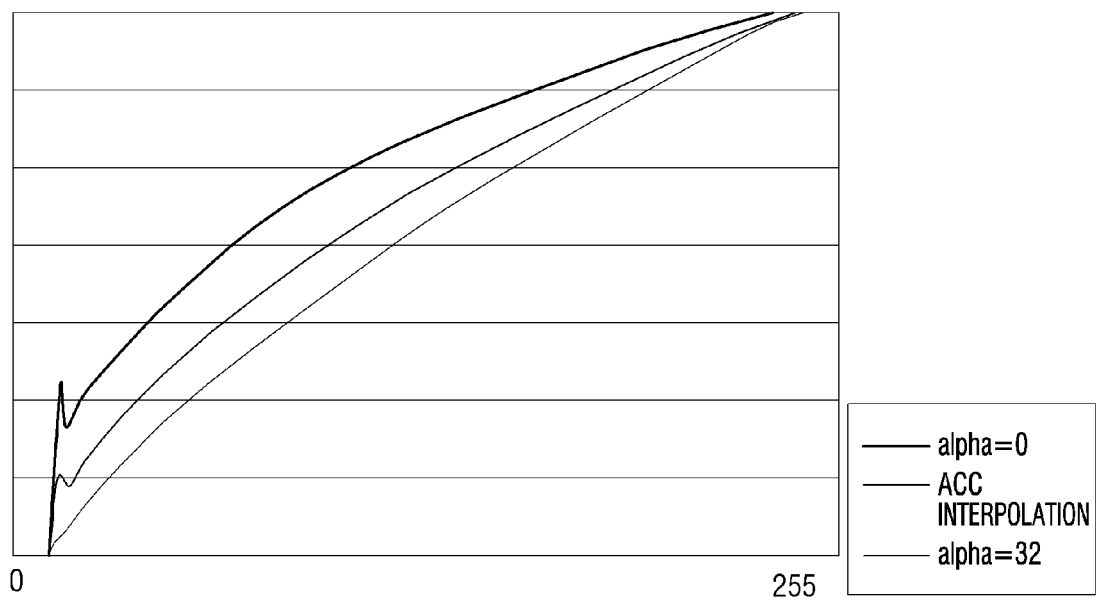

FIGS. 6 and 7 are graphs illustrating an ACC interpolation method according to an exemplary embodiment of the present general inventive concept.

The ACC interpolating module 123 calculates an ACC interpolation ratio to compensate a color coordinate and a gamma characteristic of a display liquid crystal from a luminance adjustment value map and compensates left and right eye image frame data. A recognition degree of a vision of a person depending on a luminance is not linear. When a luminance adjustment value α of FIG. 6 is 000, a luminance characteristic is similar to a luminance characteristic recognized by the vision of the person.

FIG. 6 illustrates a luminance distribution occurring when a luminance adjustment value is changed in the same gamma voltage state. Referring to FIG. 6, the gamma characteristic of the display liquid crystal varies according to the luminance adjustment value and is changed to a linear luminance characteristic with an increase in the luminance adjustment value. In other words, when the luminance adjustment value is changed, a table is required to compensate a luminance characteristic corresponding to the luminance adjustment value.

For example, two luminance tables corresponding to maximum and minimum luminance adjustment values may be stored in an ACC LUT. An interpolation ratio between two luminance tables is calculated according to input luminance adjustment values. Image frame data is compensated and output by using the calculated interpolation ratio.

FIG. 7 illustrates two luminance tables corresponding to luminance adjustment values a of 0 and 32 and an interpolation ratio calculated between the two luminance tables. Through the above-described series of processes, a luminance value varying with a luminance adjustment value may be compensated.

A series of frames inserted by generating an image interpolation frame between image frames compensated through the above-described process are output to the display 130 according to a preset order. The image frame into which the image interpolation frame is inserted will now be described.

Figure 8:
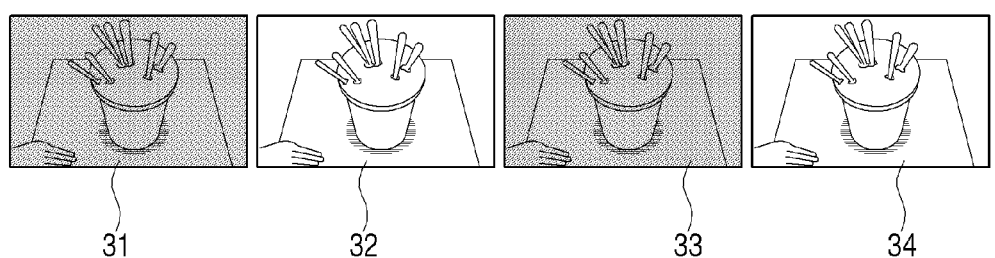
FIG. 8 is a view illustrating an image frame into which an image interpolation frame is inserted, according to an exemplary embodiment of the present general inventive concept.

FIG. 8 is a view illustrating an image frame into which an image interpolation frame is inserted according to an exemplary embodiment of the present general inventive concept.

As described with reference to FIG. 2, the interpolation frame generating module 122 mixes a first luminance adjustment map with a left eye image frame 32 to generate a left eye image interpolation frame 31. The interpolation frame generating module 122 also mixes a second luminance adjustment map with a right eye image frame 34 to generate a right eye image interpolation frame 33.

The left eye image interpolation frame 31 is inserted in front of the left eye image frame 32, and the right eye image interpolation frame 33 is inserted in front of the right eye image frame 34. As non-limiting examples the left eye image interpolation frame 31, the left eye image frame 32, the right eye image interpolation frame 33, and the right eye image frame 34 may be sequentially output through the display 130 or the right eye image interpolation frame 33, the right eye image frame 34, the left eye image interpolation frame 31, and the left eye image frame 32, may be sequentially output through the display 130. However, the order may be preset and not limited thereto.

An overall flow of the above-described process will now be described.

FIGS. 9 and 10 are flowcharts illustrating a method of controlling a display apparatus according to an exemplary embodiment of the present general inventive concept.

FIG. 9 is a flowchart illustrating a control method according to an exemplary embodiment of the present general inventive concept. Referring to FIG. 9, in operation S910, the image input part 110 receives left and right eye image frames. The image processor 120 generates a left eye image interpolation frame by using gradation differences of areas between a previous right eye image frame of the left eye image frame and the left eye image frame. In operation S920, the image processor 120 generates a right eye image interpolation frame by using gradation differences of areas between a previous left eye frame of the right eye image frame and the right eye image frame. The detailed process is as described above and thus will be omitted herein. In operation S930, the display 130 displays the left eye image interpolation frame, the left eye image frame, the right eye image interpolation frame, and the right eye image frame according to a preset order. As non-limiting examples, the display 130 may display a left eye image interpolation frame, the left eye image frame, a right eye image interpolation frame, and the right eye image frame sequentially according to the preset order, or display a right eye image interpolation frame, the right eye image frame, the left eye image interpolation frame and the left eye image frame sequentially according to the preset order.

FIG. 10 is a flowchart illustrating a control method including a detailed process of the image processor 120, according to an exemplary embodiment of the present general inventive concept. Referring to FIG. 10, in operation S1010, the image input part 110 receives left and right eye image frames. In operation S1020, the luminance adjustment value map generating module 121 generates luminance adjustment value maps for the left and right eye image frames. In operation S1030, the ACC interpolating module 123 compensates the left and right eye image frames by using an ACC interpolation ratio. In operation S1040, the DCC processing module 124 generates an over-drive voltage value to compensate the left and right eye image frames. The compensation using the ACC interpolation ratio and the compensation using the over-drive voltage are performed with respect to the left and right eye image frames.

In operation S1050, the interpolation frame generating module 122 respectively mixes luminance adjustment value maps of the left and right eye image frames with the left and right eye image frames to respectively generate left and right eye image interpolation frames. In operation S1060, the display 130 displays the left and right eye image interpolation frames and the left and right eye image frames according to a preset order. Detailed descriptions of the above-described operations are as described above and thus will be omitted herein.

A method of controlling a display apparatus according to the above-described various exemplary embodiments may be embodied as a program and then provided to the display apparatus.

For example, there may be provided a non-transitory computer readable medium which stores a program performing: receiving left and right eye image frames; generating a left eye image interpolation frame by using a gradation difference of areas between a previous right eye image frame of the left eye image frame and the left eye image frame and generating a right eye image interpolation frame by using a gradation difference of areas between a previous left eye image frame of the right eye image frame and the right eye image frame; and displaying the left eye image interpolation frame, the left eye image frame, the right eye image interpolation frame, and the right eye image frame sequentially according to a preset order.

The non-transitory computer readable medium refers to a medium which does not store data for a short time such as a register, a cache memory, a memory, or the like but semi-permanently stores data and is readable by a device. The above-described applications or programs may be recorded or stored in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks, DVDs and Blu-rays; magneto-optical media such as optical disks; and hardware devices that are specially configured to store and perform program instructions, such as read-only memory (ROM), random access memory (RAM), flash memory, a universal serial bus (USB), a memory card and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus, comprising:
an image input part to receive a left eye image frame and a right eye image frame;
an image processor to divide a previous right eye image frame which is a previous image frame of the received left eye image frame and the received left eye image frame into a plurality of areas, to divide a previous left eye image frame which is a previous image frame of the received right eye image frame and the received right eye image frame into a plurality of areas, to generate a left eye image interpolation frame by using a gradation difference of each of the plurality of areas between the previous right eye image frame of the received left eye image frame and the received left eye image frame and to generate a right eye image interpolation frame by using a gradation difference of each of the plurality of areas between the previous left eye image frame of the received right eye image frame and the received right eye image frame;
a display to display the left eye image interpolation frame, the received left eye image frame, the right eye image interpolation frame, and the received right eye image frame according to a preset order; and
a controller to control the image processor to generate the left eye image interpolation frame and the right eye image interpolation frame.

2. The display apparatus of claim 1, wherein the image processor:
compares gradations of the received left eye image frame and the previous right eye image frame according to the plurality of areas to calculate luminance adjustment values of the plurality of areas, and generates the left eye image interpolation frame by using the calculated luminance adjustment values; and
compares gradations of the received right eye image frame and the previous left eye image frame according to the plurality of areas to calculate luminance adjustment values of the plurality of areas, and generates the right eye image interpolation frame by using the calculated luminance adjustment values.

3. The display apparatus of claim 1, wherein the image processor:
calculates gradation differences of the plurality of areas between the received left eye image frame and the previous right eye image frame, determines luminance adjustment values of the plurality of areas on levels corresponding to sizes of the gradation differences from levels between 0 and 1, and applies the determined luminance adjustment values to the plurality of areas to generate a first luminance adjustment value map; and
calculates gradation differences of the plurality of areas between the received right eye image frame and the previous left eye image frame, determines luminance adjustment values of the plurality of areas on levels corresponding to sizes of the gradation differences from levels between 0 and 1, and applies the luminance adjustment values to the plurality of areas to generate a second luminance adjustment value map.

4. The display apparatus of claim 3, wherein the image processor performs a space filtering with respect to the first luminance adjustment value map and the second luminance adjustment value map, calculates an Accurate Color Capture (ACC) interpolation ratio respectively from the filtered first luminance adjustment value map and the second luminance adjustment value map, and compensates the received left eye image frame and the received right eye image frame by using the ACC interpolation ratio.

5. The display apparatus of claim 3, wherein:
the first luminance adjustment value map is mixed with the received left eye image frame to generate the left eye image interpolation frame; and
the second luminance adjustment value map is mixed with the received right eye image frame to generate the right eye image interpolation frame.

6. The display apparatus of claim 1, wherein the image processor generates an over-drive voltage value to compensate the received left eye image frame and the received right eye image frame.

7. A method of controlling a display apparatus, the method comprising:
receiving a left eye image frame and a right eye image frame;
dividing a previous right eye image frame which is a previous image frame of the received left eye image frame and the received left eye image frame into a plurality of areas and dividing a previous left eye image frame which is a previous image frame of the received right eye image frame and the received right eye image frame into a plurality of areas;
generating a left eye image interpolation frame by using a gradation difference of each of the plurality of areas between the previous right eye image frame of the received left eye image frame and the received left eye image frame and generating a right eye image interpolation frame by using a gradation difference of each of the plurality of areas between the previous left eye image frame of the received right eye image frame and the received right eye image frame; and
displaying the left eye image interpolation frame, the received left eye image frame, the right eye image interpolation frame, and the received right eye image frame according to a preset order.

8. The method of claim 7, wherein the generation of the left eye image interpolation frame and the right eye image interpolation frame comprises:
comparing gradations of the received left eye image frame and the previous right eye image frame according to the plurality of areas to calculate luminance adjustment values of the plurality of areas, and generating the left eye image interpolation frame by using the calculated luminance adjustment values; and
comparing gradations of the received right eye image frame and the previous left eye image frame according to the plurality of areas to calculate luminance adjustment values of the plurality of areas, and generating the right eye image interpolation frame by using the calculated luminance adjustment values.

9. The method of claim 7, further comprising:
calculating gradation differences of the plurality of areas between the received left eye image frame and the previous right eye image frame, determining luminance adjustment values of the plurality of areas on levels corresponding to sizes of the gradation differences from levels between 0 and 1, and applying the determined luminance adjustment values to the plurality of areas to generate a first luminance adjustment value map; and calculating gradation differences of the plurality of areas between the received right eye image frame and the previous left eye image frame, determining luminance adjustment values of the plurality of areas on levels corresponding to sizes of the gradation differences from levels between 0 and 1, and applying the luminance adjustment values to the plurality of areas to generate a second luminance adjustment value map.

10. The method of claim 9, further comprising:
performing a space filtering with respect to the first luminance adjustment value map and the second luminance adjustment value map, calculating an ACC interpolation ratio respectively from the filtered first luminance adjustment value map and second luminance adjustment value map, and compensating the received left eye image frame and the received right eye image frame by using the ACC interpolation ratio.

11. The method of claim 9, wherein the generation of the left eye image interpolation frame and the right eye image interpolation frame comprises:
mixing the first luminance adjustment value map with the received left eye image frame to generate the left eye image interpolation frame; and
mixing the second luminance adjustment value map with the received right eye image frame to generate the right eye image interpolation frame.

12. The method of claim 7, further comprising:
generating an over-drive voltage value to compensate the received left eye image frame and the received right eye image frame.

13. The display apparatus of claim 1, wherein the display displays the left eye image interpolation frame, the received left eye image frame, the right eye image interpolation frame, and the received right eye image frame sequentially according to the preset order.

14. The display apparatus of claim 1, wherein the display displays the right eye image interpolation frame, the received right eye image frame, the left eye image interpolation frame, and the received left eye image frame sequentially according to the preset order.

15. The method of claim 7, wherein the left eye image interpolation frame, the received left eye image frame, the right eye image interpolation frame, and the received right eye image frame are displayed sequentially according to the preset order.

16. The method of claim 7, wherein the right eye image interpolation frame, the received right eye image frame, the left eye image interpolation frame, and the received left eye image frame are displayed sequentially according to the preset order.

17. A method of controlling a display apparatus, the method comprising:
receiving a left eye image frame and a right eye image frame;
dividing a previous right eye image frame which is a previous image frame of the received left eye image frame and the received left eye image frame into a plurality of areas, and dividing a previous left eye image frame which is a previous image frame of the received right eye image frame and the received right eye image frame into a plurality of areas;
generating a luminance adjustment value map corresponding to the received left eye image frame and the received right eye image frame;
compensating the received left eye image frame and the received right eye image frame by using an ACC interpolation ratio; and
generating an over-drive voltage value to compensate the received left eye image frame and the received right eye image frame.

18. The method of claim 17, further comprising:
generating a left eye image interpolation frame and a right eye image interpolation frame by mixing the luminance adjustment value map corresponding to the received left eye image frame and the received right eye image frame with the previous left eye image frame and the previous right eye image frame, respectively.

19. The method of claim 18, further comprising:
displaying the left eye image interpolation frame and the right eye image interpolation frame and the received left eye image frame and the received right eye image frame according to a preset order.

20. The method of claim 19, wherein the left eye image interpolation frame, the received left eye image frame, the right eye image interpolation frame, and the received right eye image frame are displayed sequentially according to the preset order.

21. The method of claim 19, wherein the right eye image interpolation frame, the received right eye image frame, the left eye image interpolation frame, and the received left eye image frame are displayed sequentially according to the preset order.

* * * * *